(12) United States Patent
Sugita et al.

(10) Patent No.: US 6,815,115 B2
(45) Date of Patent: Nov. 9, 2004

(54) FUEL CELL AND FUEL CELL STACK

(75) Inventors: Narutoshi Sugita, Utsunomiya (JP); Yoshihiro Nakanishi, Kawachi-gun (JP); Hideaki Kikuchi, Kawachi-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 198 days.

(21) Appl. No.: 10/094,482

(22) Filed: Mar. 7, 2002

(65) Prior Publication Data

US 2002/0127461 A1 Sep. 12, 2002

(30) Foreign Application Priority Data

Mar. 9, 2001 (JP) .................................... P2001-066748

(51) Int. Cl.[7] ............................ H01M 2/08; H01M 8/10
(52) U.S. Cl. ........................................... 429/35; 429/32
(58) Field of Search ..................................... 429/32, 35

(56) References Cited

U.S. PATENT DOCUMENTS

| | | | | |
|---|---|---|---|---|
| 4,751,153 A | * | 6/1988 | Roth | ............................ 429/35 |
| 5,424,144 A | * | 6/1995 | Woods, Jr. | .................... 429/35 |
| 6,040,076 A | * | 3/2000 | Reeder | ......................... 429/35 |
| 6,261,711 B1 | * | 7/2001 | Matlock et al. | ............ 429/35 X |
| 6,436,568 B1 | * | 8/2002 | Schilling et al. | ............... 429/35 |
| 6,599,653 B1 | * | 7/2003 | Cummins et al. | .............. 429/35 |
| 2002/0122970 A1 | * | 9/2002 | Inoue et al. | ................. 429/365 |

* cited by examiner

*Primary Examiner*—Stephen J. Kalafut
(74) *Attorney, Agent, or Firm*—Lahive & Cockfield, LLP; Anthony A. Laurentano, Esq.

(57) ABSTRACT

The present invention provides a fuel cell comprising a pair of separators sandwiching outsides of a membrane electrode assembly composed of a pair of electrodes provided on both sides of a solid polymer electrolyte membrane, an outer seal member sandwiched by a pair of separators at a position surrounding an outer periphery of the membrane electrode assembly, an inner seal member sandwiched by one of the pair of separators and an outer periphery of the electrolyte membrane, and a backing member opposing to the inner seal member interposing the electrolyte membrane, wherein steps are formed at contact surfaces of the inner seal member and the outer seal member on one of the pair of separators.

17 Claims, 7 Drawing Sheets

FUEL CELL AND FUEL CELL STACK

BACKGROUND OF THE INVENTION

1. Field of the Invention

The present invention relates to a solid polymer electrolyte membrane type fuel cell and to a fuel cell stack constituted by stacking a plurality of the fuel cell units, and more specifically, relates to a technique for absorbing expansion and contraction of the fuel cell stack in the stacking direction of separators.

2. Description of the Related Art

Fuel cells include a solid polymer electrolyte membrane type fuel cell constituted by providing a pair of electrodes on opposite sides of the solid polymer electrolyte membrane and sandwiching the outside thereof by a pair of separators.

In this fuel cell, a passage for a fuel gas (for example, hydrogen) is provided on the entire surface of a separator provided facing one electrode, a passage for an oxidant gas (for example, air including oxygen) is provided on the entire surface of a separator provided facing the other electrode, and a passage for a cooling medium is provided on either one of the surfaces of separators opposite to a surface facing the electrode.

When the fuel gas is supplied to the reaction surface of one electrode, hydrogen is ionized and moves to the other electrode via the solid polymer electrolyte membrane. Electrons generated during the reaction process are taken out to an external circuit, and are used as direct-current electrical energy.

Since the oxidant gas is supplied to the other electrode, the hydrogen ions, the electrons and the oxygen react with each other to thereby generate water.

The surface on the opposite side of the electrode reaction plane of the separator is cooled by the cooling medium flowing between the separators.

Since these reactant gases and the cooling medium should flow in respectively independent passages, a sealing technique, which separates each passage, is important.

The portions to be sealed include, for example, the peripheries of communication holes formed penetrating through the separator so as to distribute and supply the reactant gas and the cooling medium to each fuel cell unit in the fuel cell stack, the outer peripheries of membrane electrode assembly formed of the solid polymer electrolyte membrane and a pair of electrodes arranged on opposite sides thereof, the outer peripheries of a coolant passage plane of the separator, and the outer peripheries of front and back faces of the separator. As the sealing material, an elastic and adequately resilient material, for example, an organic rubber, is adopted.

Conventionally, a fuel cell having a membrane electrode assembly by sandwiching a solid polymer electrolyte membrane by a pair of electrodes and sandwiching the outside thereof by a pair of separators, comprises a membrane electrode assembly (as shown in FIG. 17) constituted by sandwiching a solid polymer electrolyte membrane having a larger outer size between a pair of gas diffusion layers each having the same size, and the outer size thereof is smaller than that of the solid polymer electrolyte membrane, as disclosed in Japanese Unexamined Patent Application, First Publication No. Hei 8-148169. In this type of fuel cell 40, the passage for the fuel gas 41 and the passage for the oxidant gas 42 are sealed by sandwiching with a pair of O-ring the portion of the solid polymer electrolyte membrane 45, which is protruded from the outer peripheries of the anode electrode 43 and the cathode electrode 44.

However, in such a sealing structure, a problem arises in that sealing of passages may fail if a pair of O-rings each disposed on both side of the solid polymer electrolyte member are insufficiently aligned.

For example, as shown in FIG. 18, if two O-rings on both surface of the solid polymer electrolyte membrane are disposed out of positions, the pressure of both O-rings press the solid polymer membrane and the solid polymer electrolyte membrane 45 is be deformed such that the surface pressure of the O-rings becomes insufficient to provide a hermetic seal. In addition, an unfavorable phenomenon will be caused by deformation of the solid polymer electrolyte membrane in that the solid polymer electrolyte membrane will be peeled off from the anode electrode 43 and the cathode electrode 44.

In order to avoid such unfavorable phenomena, the grooves to align O-rings must be formed in a very precise manner, which results in increasing the manufacturing cost.

Since the fuel cell 40 is used as a fuel cell stack after stacking a plurality of fuel cell units, the thickness of the fuel cell unit is desired to be as thin as possible.

SUMMARY OF THE INVENTION

An object of the present invention is to solve the aforementioned problems and to provide fuel cell units and a fuel cell stack formed by stacking a plurality of fuel cell units, wherein those fuel cell units and a fuel cell stack have an improved sealability between the membrane electrode assembly and separators, a reduced cost, and an improved thickness in the direction of stacking.

In order to solve the above problems, the first aspect of the present invention provides a fuel cell which comprises a pair of separators (for example, a first separator 3 and a second separator 4 in the embodiment) sandwiching outsides of a membrane electrode assembly composed of a pair of electrodes provided on both sides of a solid polymer electrolyte membrane, an outer seal member sandwiched by a pair of separators at a position surrounding an outer periphery of the membrane electrode assembly, an inner seal member sandwiched by one (for example, the second separator 4 in the embodiment) of the pair of separators and an outer periphery of the electrolyte membrane, and a backing member (for example, an anode electrode in the embodiment) opposing to the inner seal member interposing the electrolyte membrane, wherein a step is formed at contact surfaces (a first plane portion 22 and a second plane portion 23 in the embodiment) of the inner seal member and the outer seal member on one of the pair of separators.

In the fuel cell according to the first aspect of the present invention, since the outer seal member surrounding the periphery of the membrane electrode assembly tightly seals a space between the first and second separators, and the inner seal member which is arranged at the outer periphery of the electrolyte membrane constituting the membrane electrode assembly at the inner side of the outer seal member tightly seals the space between the separator and the electrolyte membrane, the space between separators are separated on both side of the electrolyte membrane into two separated regions, one of which is located at the anode side and the other one is located at the cathode side.

Since the inner seal member and the second separator sandwiches the electrolyte membrane together with the backing member, the thin electrolyte membrane is reinforced by the backing member so that it can be protected from being deformed by a pressure through the inner seal member. In addition, since the electrolyte membrane is not deformed, the inner seal member is able to maintain sufficient surface pressure to attain the sufficient sealing ability.

In the above case, in contrast to the outer seal member tightly which seals the space between two separators, the inner seal member performs tight sealing between two separators including the electrolyte membrane and the backing member in between, so that a difference in thickness is generated between the inner seal member and the outer seal member. For example, even when the thickness of the inner seal member is set to a minimum thickness including a deformable portion for sealing, the thickness of the outer seal member which must seal a wider space than that for the inner seal member becomes excessively thick.

In both separators in contact with the outer seal member and the inner seal member, if the heights of the contact planes with both seal members are changed, that is, if a step is formed between respective contact planes, it becomes possible to reduce the thickness of the outer seal member, which results in reducing the material consumption of the seal member and reducing the product cost. In addition, since it is possible to reduce the thickness of the outer seal member while maintaining the necessary thickness for the inner seal member, it is possible to reduce the thickness of the fuel cell unit.

In a fuel cell according to the second aspect of the present invention, the anode electrode or the cathode electrode is used as the backing member of the electrolyte membrane.

According to the second aspect of the present invention, the fuel cell uses a backing member of the electrolyte membrane the anode electrode or the cathode electrode, without using a separate element.

Application of the anode electrode or the cathode electrode to the electrolyte membrane without using a separate element as the backing member makes it possible to reduce the number of parts in the fuel cell and to reduce the product cost.

According to the third aspect of the present invention, the present invention proposes to use the second separator as a backing member for reinforcing the electrolyte membrane.

Application of the second separator to the electrolyte membrane as the backing member without using a separate element makes it possible to reduce the number of parts in the fuel cell and to reduce the product cost.

The fourth to sixth aspects of the present invention propose a fuel cell stack, formed by stacking a plurality of fuel cells according to one among the first to the third aspects.

Since the thickness of the individual fuel cell is reduced as described above, the thickness of the fuel cell stack can be reduced by an amount corresponding to the reduced thickness for a fuel cell times the number of stacked fuel cells for forming the fuel cell stack.

DETAILED DESCRIPTION OF THE INVENTION

Hereinafter, embodiments of the present invention will be described with reference to the attached drawings.

Figure 1:
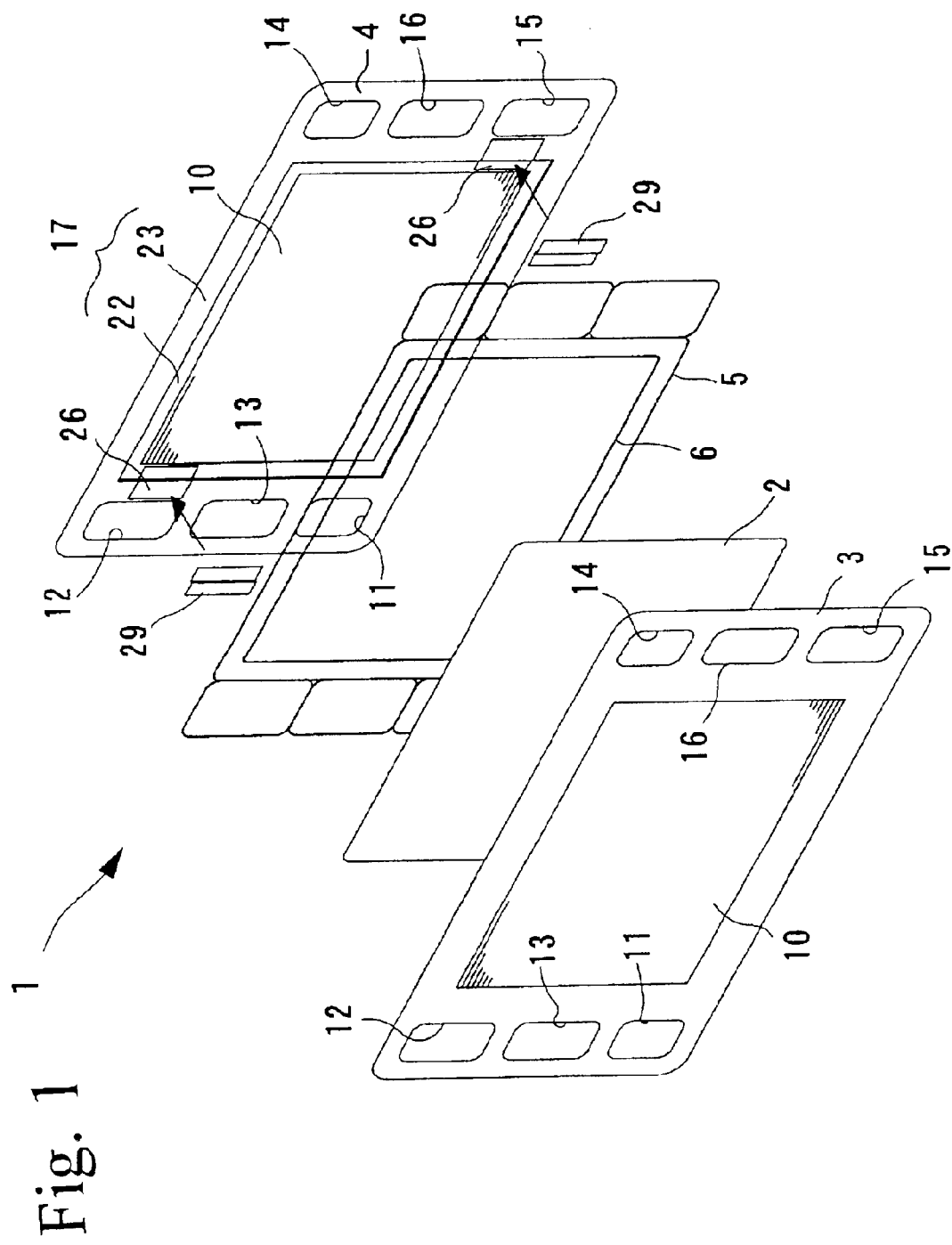
FIG. 1 is an exploded perspective view showing constituting elements of a fuel cell according to the first embodiment of the present invention.

A fuel cell according to the present embodiment is, as shown in FIG. 1, constructed by sandwiching a membrane electrode assembly 2 with a pair of separators (first separator 3 and second separator 4), by tightly sealing the space between the first separator 3 and the second separator 4 with an outer peripheral sealing member 5 so as to surround the membrane electrode assembly 2, and by tightly sealing the space between the second separator 4 and the membrane electrode assembly 2 with an inner peripheral sealing member 6.

The aforementioned membrane electrode assembly comprises a solid polymer electrolyte membrane 8 (hereinafter, abbreviated as electrolyte membrane), made of a perfluorosulfonate polymer, and an anode electrode 7 and a cathode electrode 9, which sandwich both surfaces of the electrolyte membrane 8.

The anode electrode 7 and cathode electrode 9 are constituted by, for example, laminating a catalyst layer made of a platinum alloy mainly formed by platinum, on a gas diffusion layer of the electrolyte membrane 8, wherein the gas diffusion layer is formed by a porous carbon cloth or a porous carbon paper.

The aforementioned electrolyte membrane 8 is formed as a rectangle and the anode electrode 7 is formed covering the total surface area of the electrolyte membrane or covering a larger area than the total area of the electrolyte membrane protruding from the edge of the electrolyte membrane 8. The cathode electrode 9 is formed in a smaller area than that of the anode electrode. These electrolyte membrane, anode electrode, and cathode electrode are formed such that the center of gravity of each element coincides and each element has the same dimensions from the edge of the electrolyte membrane. The anode electrode 7 thereby covers the entire surface of one surface of the electrolyte membrane 8 like a backing, and in contrast, the outer periphery of the other surface of the electrolyte membrane 8 is exposed and the inside of this surface is covered by the cathode electrode 9.

The aforementioned first separator 3 and the second separator 4, as shown in FIG. 1, comprise a corrugated sheet portion 10 in which a plurality of concave and convex portions having a certain height are formed in a certain pattern by press molding a stainless steel plate material having a plate thickness of from 0.2 to 0.5 mm; a fuel gas supply port 11, an oxidant gas supply port 12, a cooling medium supply port 13, a fuel gas exhaust port 14, an oxidant gas exhaust port 15, a cooling medium exhaust port 16 for supplying and exhausting the fuel gas (for example, hydrogen gas) and oxidant gas (for example, air containing oxygen) and the cooling medium (for example, water); and furthermore, a plane portion 17 is disposed so as to respectively surround these supply ports 11 to 13 and these exhaust ports 14 to 16.

Figure 3:
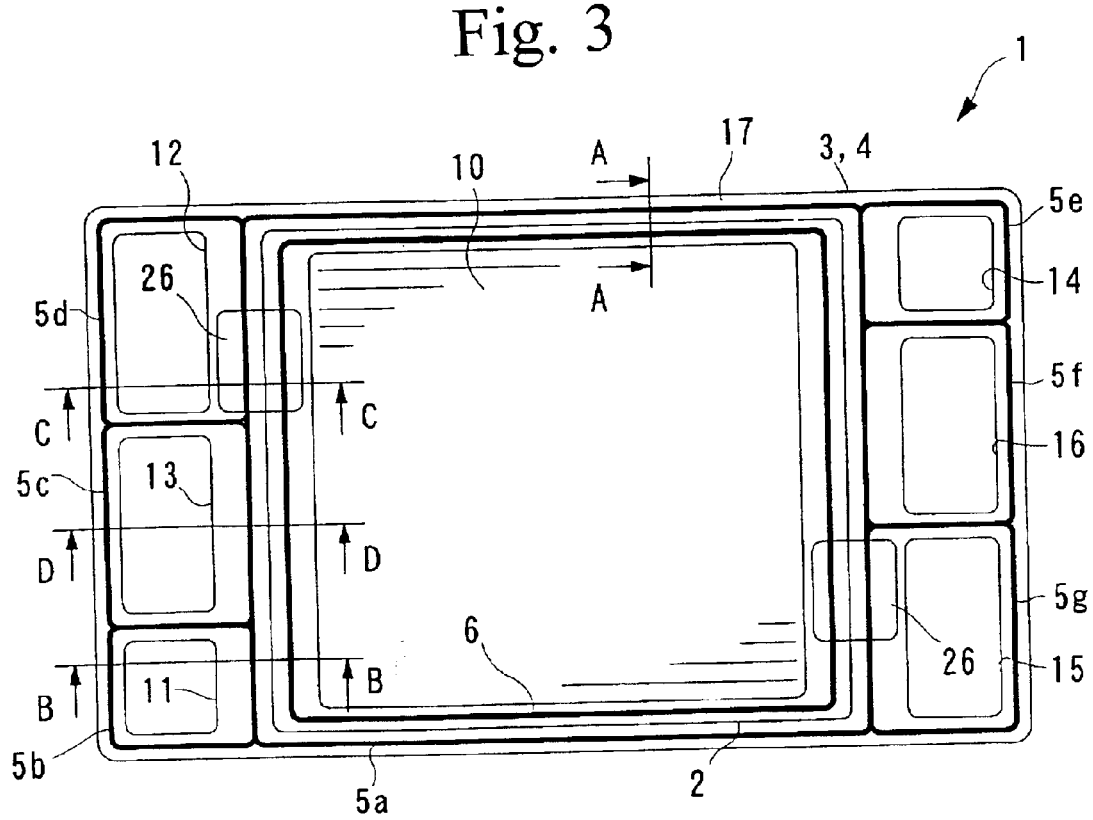
FIG. 3 is a plan view showing a schematic assembled state of the constituting elements of the fuel cell shown in FIG. 1.

The above-described cooling medium supply port 13 and the cooling medium exhaust port 16 are disposed at the center portion in the direction of width of the separators 3 and 4, as shown in FIG. 3. The fuel gas supply port 11 and the oxidant gas supply port 12 are disposed on both sides of the separators 3 and 4 in the direction of the width interposing the cooling medium supply port 13 therebetween. Furthermore, the fuel gas exhaust port 14 and the oxidant gas exhaust port 15 are disposed on both sides of the separators 3 and 4 in the direction of the width interposing the cooling medium exhaust port 16 therebetween. These fuel gas exhaust port 14 and the oxidant gas exhaust port 15 are disposed respectively so as to occupy diagonal positions of the fuel gas supply port 11 and the oxidant gas supply port 12.

Figure 4:
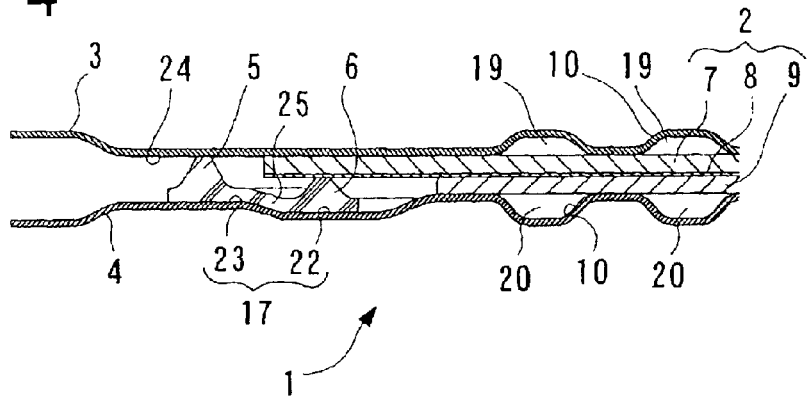
FIG. 4 is a longitudinal cross-sectional view of a fuel cell shown in FIG. 1 along line A—A shown in FIG. 3.
Figure 5:
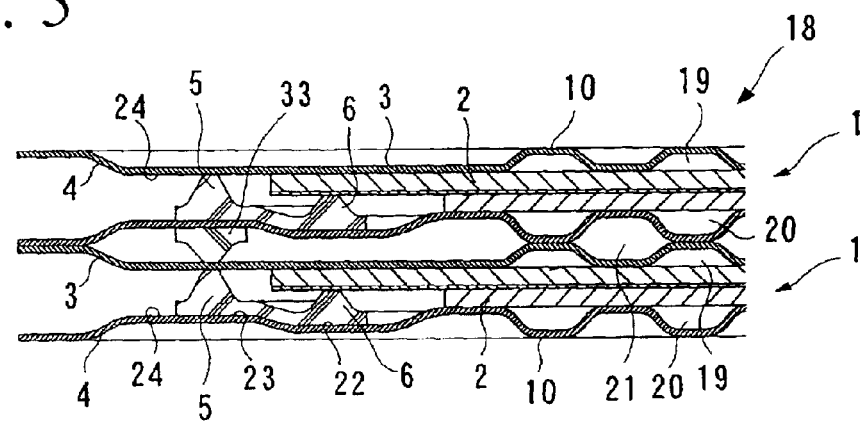
FIG. 5 is a longitudinal cross-sectional view of a fuel cell stack formed by stacking two fuel cell units.
Figure 6:
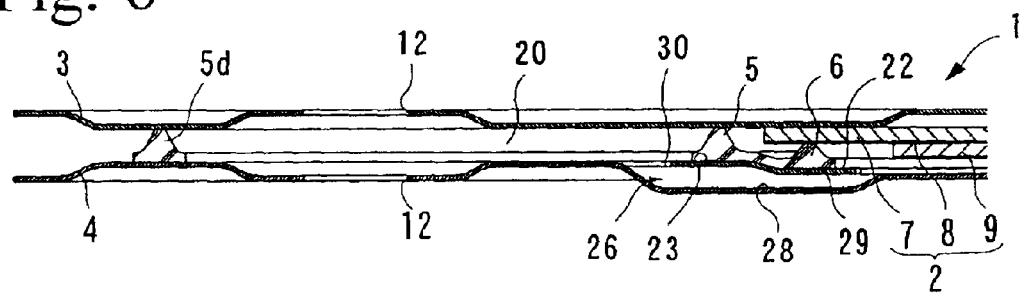
FIG. 6 is a longitudinal cross-sectional view of the fuel cell shown in FIG. 1 cut along line B—B shown in FIG. 3 in the vicinity of the inlet port of the oxidant gas.
Figure 7:
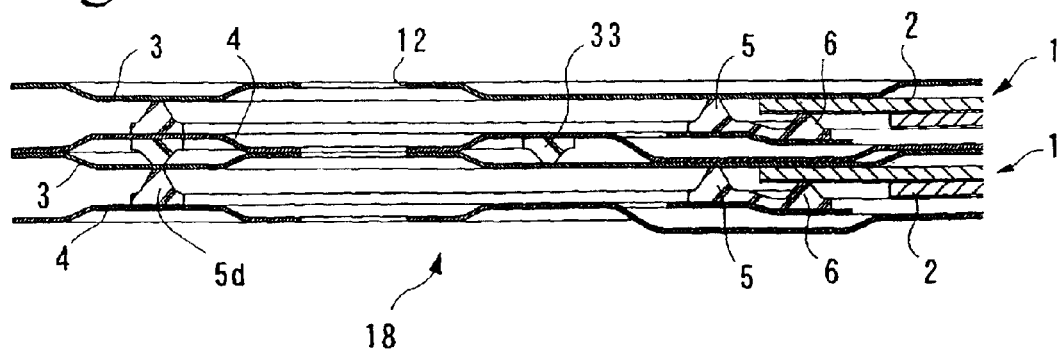
FIG. 7 is a longitudinal cross-sectional view showing a fuel cell stack formed by stacking two fuel cell units.
Figure 8:
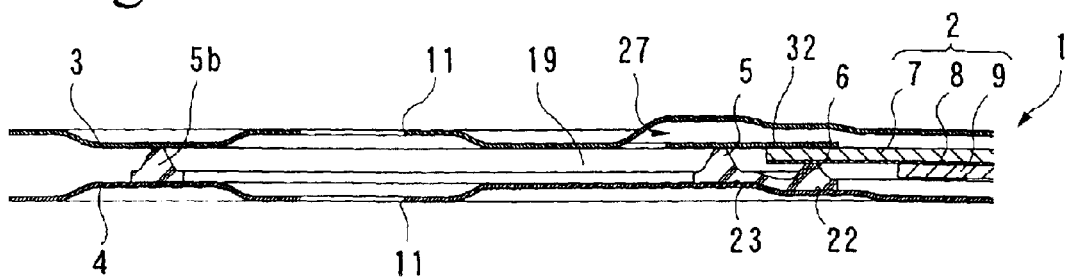
FIG. 8 is a longitudinal cross-sectional view of the fuel cell shown in FIG. 1 cut along line C—C shown in FIG. 3 in the vicinity of the inlet port of the fuel gas.
Figure 9:
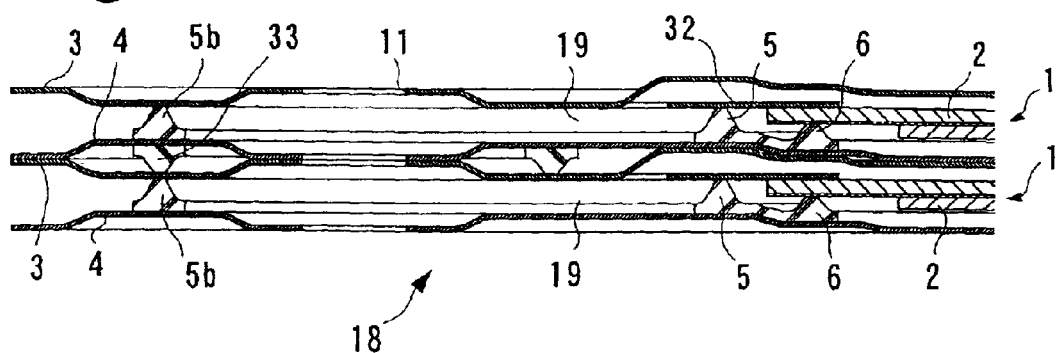
FIG. 9 is a longitudinal cross-sectional view of the fuel cell stack formed by stacking two fuel cell units shown in FIG. 8.
Figure 10:
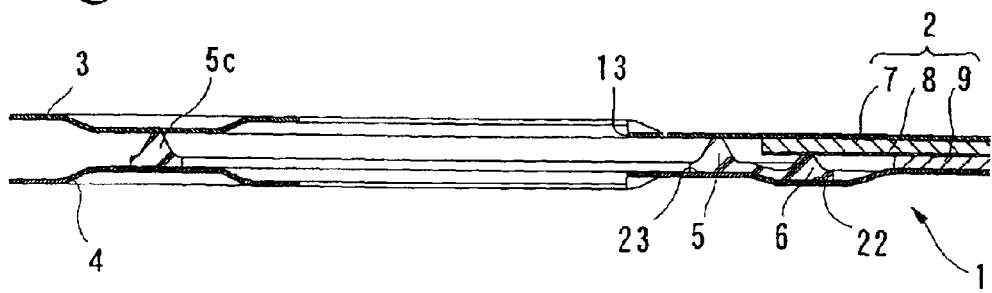
FIG. 10 is a longitudinal cross-sectional view of the fuel cell shown in FIG. 1 cut along line D—D shown in FIG. 3 in the vicinity of the inlet port of the cooling medium.
Figure 11:
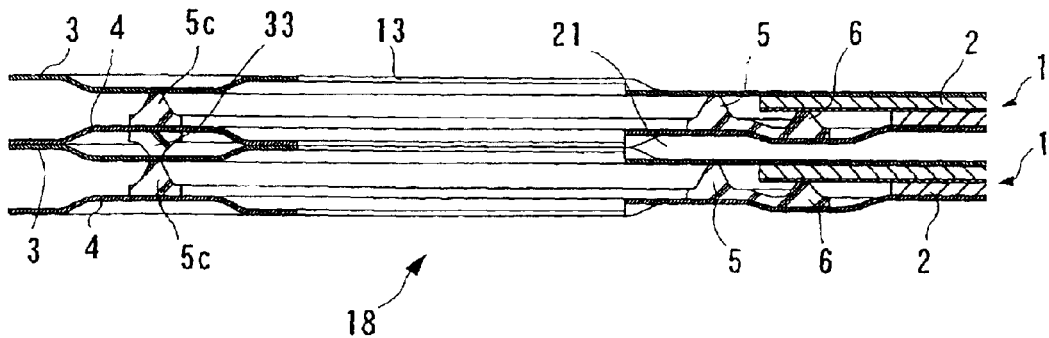
FIG. 11 is a longitudinal cross-sectional view of the fuel cell stack formed by stacking two fuel cell units shown in FIG. 10.

FIG. 4 shows a longitudinal cross-section of the side portion of the fuel cell along the line A—A in FIG. 3, FIG. 6 shows a longitudinal cross-section of the fuel cell adjacent to the fuel gas inlet port 12 along the line B—B in FIG. 3, FIG. 8 is a longitudinal cross-section of the fuel cell adjacent to the oxidant gas inlet port 13 along the line C—C in FIG. 3, and FIG. 10 is a longitudinal cross-section of the fuel cell adjacent to the cooling medium inlet port 13 along the line D—D in FIG. 3. FIGS. 5, 7, 9, and 11 are longitudinal cross-sections of the fuel stacks 18, in which two fuel cells shown respectively in FIGS. 4, 6, 8, and 10 are stacked.

As shown in FIG. 4, regarding the aforementioned corrugated portions 10 of the first and second separators, the corrugated portion 10 of the first separator 3 defines a passage 19 for the fuel gas between the anode electrode 7, which constitutes the membrane electrode assembly 2, and the corrugated portion 10 of the second separator 4 defines a passage 20 for the oxidant gas. As shown in FIG. 5, in the state when a fuel stack is formed by stacking fuel cells, a corrugated portion 10 of the first separator 3 of an adjacent fuel cell 1 and the corrugated portion 10 of the second separator 4 form a passage 21 for circulating the cooling medium.

As shown in FIG. 1, the aforementioned plane portion 17 of the second separator 4 is divided into a first plane portion 22, which is in contact with the inner seal member 6, and a second plane portion 23, which is in contact with the outside seal member 5.

Figure 2:
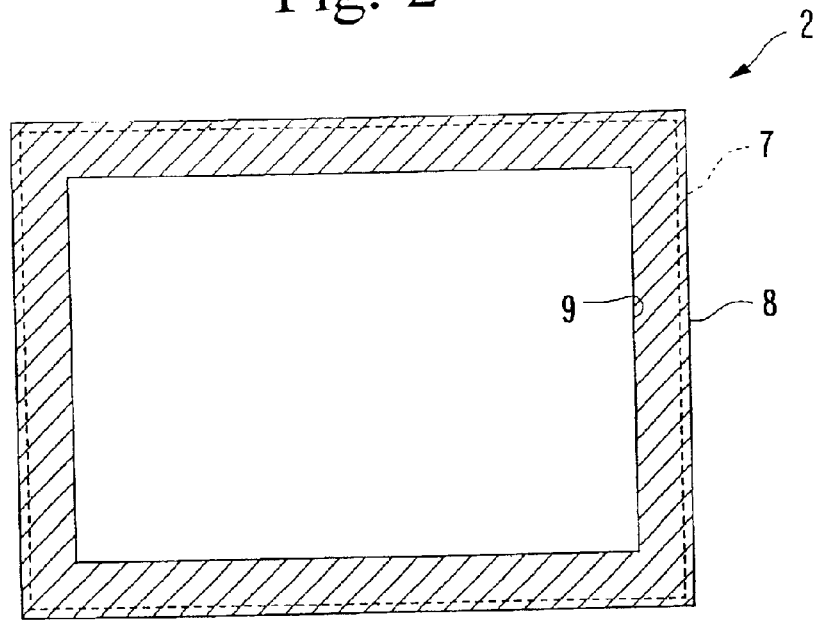
FIG. 2 is a plan view showing a membrane electrode assembly used in the fuel cell shown in FIG. 1.

The first plane portion 22 is disposed so as to face a protruded portion (shown as a portion defined by oblique lines in FIG. 2) of the anode electrode 7, which is protruded from the outer periphery of the cathode electrode 6 by an amount corresponding to the height difference of both electrodes.

The second plane portion 23 is disposed so as to enclose the membrane electrode assembly at the outer side of the outer periphery of the membrane electrode assembly 2 when the membrane electrode assembly 2 is disposed facing to the corrugated portion 10. In addition, the second plane portion 23 continuously extends around the supply ports of the fuel gas, oxidant gas, and cooling medium, and the exhaust ports of the fuel gas, oxidant gas, and cooling medium, which are disposed further outside the second plane portion 23.

As shown in FIG. 4, in the fuel cell according to the present embodiment, a step is formed between the first plane portion 22 and the second plane portion 23. That is, the first plane portion 22 and the second plane portion 23 are respectively disposed in two parallel planes, which are separated by a certain distance in the normal direction.

The height of the step is preferably the same dimension as that of an total thickness of the anode electrode 7 and the electrolyte membrane 8.

The plane portion 24 of the first separator 3 is disposed in a plane located opposing to the first plane portion 22 and the second plane portion 23 of the second separator 4.

As a result, the inner seal member 6 and the outer seal member 5 are formed so as to have the same cross section. In this arrangement, both seal members are preferably provided with the same height, which is the minimum required for obtaining a sufficient hermetic seal.

As shown in FIG. 3, the inner seal member 6 is formed in an approximately rectangular shaped ring to be in contact with the exposed portion of the electrolyte membrane 8 of the membrane electrode assembly 3. The outside seal member, in contrast, is formed by a plurality of approximately rectangular rings comprising a large and approximately rectangular ring portion 5a surrounding the membrane electrode assembly, and a plurality of rectangular ring portions 5b to 5g surrounding the inlet ports 11, 12, and 13 and the exhaust ports 14, 15, and 16 for the fuel, oxidant gas, and cooling medium.

All ring portions 5a to 5g are united in an integrated form, partially sharing the overlapping portions of respective rings, and thereby the sealing area is limited in a minimum area. In addition, the inner sealing member 6 and the outer sealing member 5 are integrated by connecting to each other through a connecting portion 25, and thereby the reduction of the number of parts are realized.

As described above, provisions of the outer sealing member 5 and the inner sealing member 6 allows defining and tight sealing or liquid tight sealing of the supply ports 11, 12 and 13 and exhaust ports 14, 15, and 16 of the fuel gas, oxidant gas, and cooling medium and the corrugated portion 10. Furthermore, in order to circulate and exhaust the fuel gas and oxidant gas through respective passages 19 and 20 formed between corrugated portions 10 by inputting from respective supply ports 11 and 12 and in order to exhaust these gases from respective exhaust ports 14 and 15, communication portions 26 and 27 are formed for communicating between intermediate portions of each supply port and each passage and intermediate portions between each exhaust port and each passage, detouring around the outer sealing member 5 and the inner sealing member 6.

Figure 12:
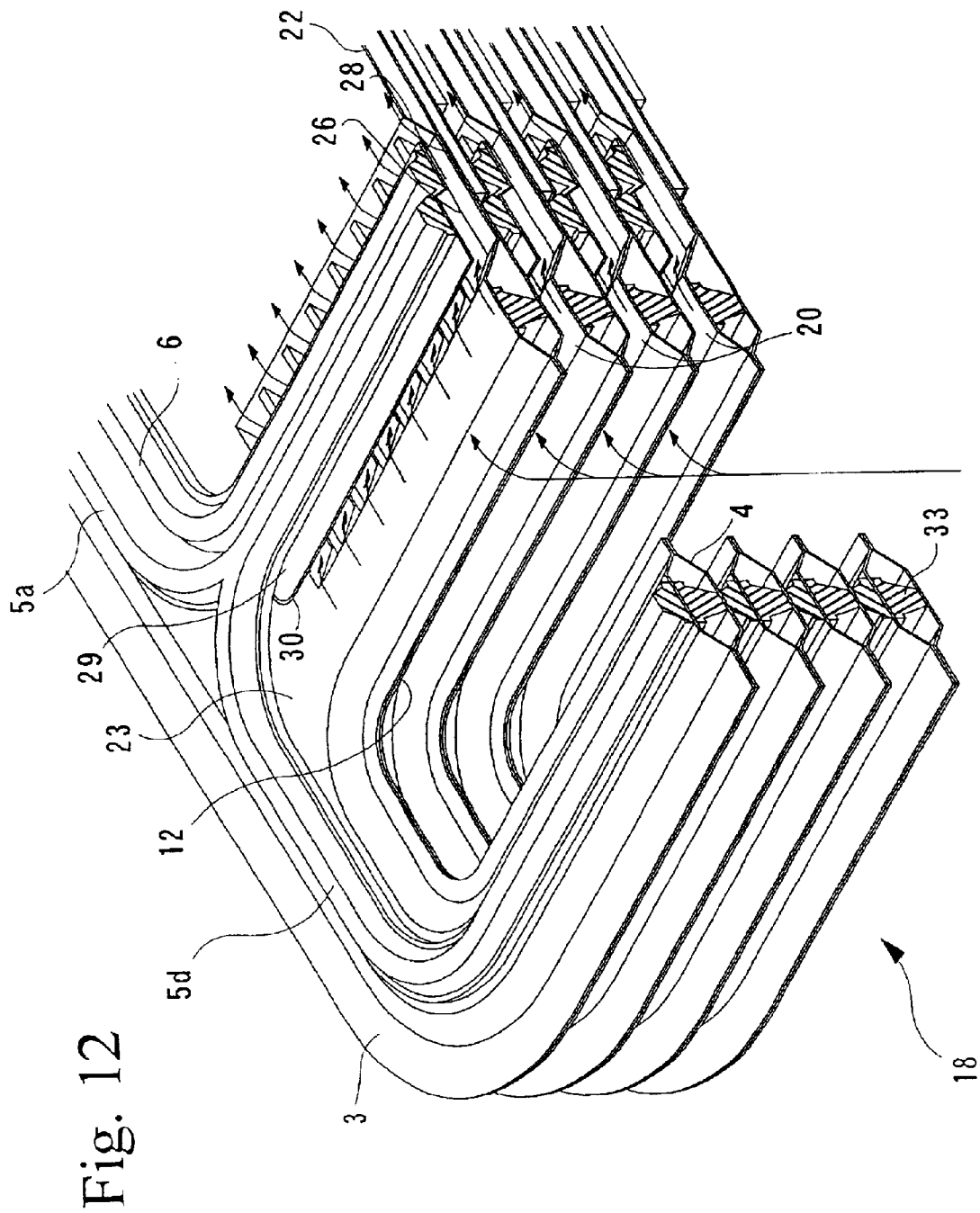
FIG. 12 is a perspective view showing a communication portion adjacent to the oxidant gas inlet port, including a partial cross-section along line B—B line shown in FIG. 3.

As shown in FIGS. 6, 7 and 12, in these communicating portions 26 and 27, the communication portion 26 of the oxidant gas, for example, is formed by crossing a bridge member 29 on a concave portion 28 in the direction along the seal members 5 and 6. The aforementioned concave portion 28 is formed by partially indenting the first plane portion 22 and the second plane portion 23 at a wider width than the total width of the outer seal member 5 and the inner seal member 6, and the bridge member 29 is formed to be narrower in the width than the width of the concave portion and is formed to be wider in the width than the total width of the outer seal member 5 and the inner seal member 6. The surface plane of the bridge member 29 is formed covering the concave portion 28 having a step in the level so as to connect the first plane portion 22 and the second plane portion 23 without difference in the level, and both ends of the bridge member are received in respective positioning recesses 30 formed on both sides of the concave portion 28 by a depth corresponding to a plate thickness.

According to the aforementioned construction, the outer seal member 5 and the inner seal member 6 allow circulation of the oxidant gas only at the communication portion 26 and the other portions are maintained at the tightly sealed state such that the oxidant gas supplied from the supply port 12 can be circulated on the surface of the cathode electrode 9 through the communication portion 26.

FIG. 12 is a perspective view showing a communication portion adjacent to the oxidant gas inlet port, including a partial cross-section along the line B-B shown in FIG. 3. By constituting the fuel stack as shown in FIG. 12, the oxidant gas which is flowed in from the oxidant gas inlet ports 12 opening while communicating in the direction of the stacking direction of the fuel cells as shown by arrows in the figure, is branched into a plurality of oxidant gas passages 20 formed between respective separators 3 and 4, in order to make a detour around the outer seal member 5 and the inner seal member 6.

As shown in FIGS. 8 and 9, similarly to the oxidant gas, the fuel gas supplied from the supply port 11, can be circulated in the passage 19, which is defined between the first separator 3 and the anode electrode 7, by forming a communication portion 27 by crossing a bridge member 32 on the concave portion 31 formed by partially depressing the first separator 3, defining the passage 19 of the fuel gas.

In the fuel gas stack formed by stacking a plurality of fuel cells, a seal member 33 is disposed between the first separator 3 of one fuel cell 1 and the second separator 4 of the other adjacent fuel cell 1 in order to define supply ports 11 and 12 and exhaust ports 14 and 15 of the fuel gas and the oxidant gas and to define a cooling medium passage from the inlet port 13 to the exhaust port 16 of the cooling medium. The seal member is disposed between two rear surfaces of respective second plane members 23 of two adjacent fuel cell units in order to support the seal member 33 in a stable and reliable manner because two separators 3 and 4 are formed by press molding the metal plates.

Hereinafter, operations and effects of the fuel cell 1 and the fuel cell stack 18 are explained.

In the fuel cell 1 according to the present embodiment, since the anode electrode 7 forming the membrane electrode assembly 2 supports one surface of the electrolyte membrane 8, the electrolyte membrane 8 is not deformed and is held in place by addition of the pressure of the inner sealing member. Accordingly, not only the hermetic seal between the electrolyte membrane 8 and the inner seal member 6 can be maintained, but also a force is not applied to both electrodes 7 and 9 to be peeled from the electrolyte membrane 8, and the membrane electrode assembly is maintained at a sound state.

Figure 13:
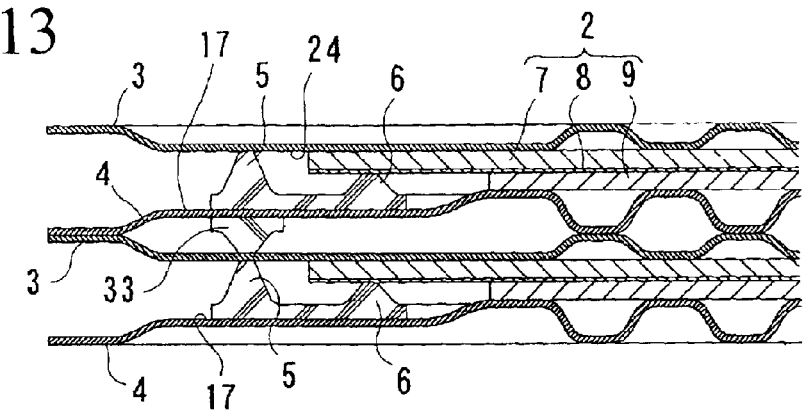
FIG. 13 is a longitudinal cross-sectional view explaining the action of the fuel cell shown in FIG. 1.

In the above case, if it is desired to hold the aforementioned hermetic seal just by sandwiching the electrolyte membrane 8 and the anode electrode 7 between the inner seal member 6 and the first separator 3, a difference in height is caused, as shown in FIG. 13, between a space between the electrolyte membrane 8 and the second separator 4 to be sealed by the inner sealing member 6 and a space between the first separator 3 and the second separator 4 to be sealed by the outer seal member 5. If the height of the inner seal member 6 is set at a minimum required height for sealing the space, the height of the outer seal member 5 for sealing a higher space than that of the space for the inner sealing member 6 becomes so high that it requires useless seal material.

In the present embodiment, since a step is formed between the first plane portion 22 and the second plane portion 23, the difference of the height between the space to be sealed by the outer seal member 5 and the space to be sealed by the inner seal member 6 can be reduced. In particular, when the height of the step is made identical with the total thickness of the thickness of the anode electrode 7 and the thickness of the electrolyte membrane 8, both space heights to be sealed by the outer and inner seal member 5 and 6 can be the same. Consequently, heights of the outer seal member 5 and the inner seal member 6 can be the same as that of the minimum height for sealing the space, which results in saving the material and reducing cost.

In the fuel cell according to the present embodiment, when compared with the fuel cell shown in FIG. 13, which does not have a step, it is possible to reduce the thickness between both separators 3 and 4 by the size of the step.

The above effect is obtained due to the reduction of the space itself between the first separator 3 and the second separator which has been sealed by outer seal member 5, whose thickness has been unnecessarily thick when the seal member 33 between two fuel cells is set at a minimum size, by dropping a part of the first plane portion 22 in contact with the inner seal member 6 in the plane portion 17 of the second separator 4 in contact with both outer seal member 5 and the inner seal member 6.

As a result, although the respective passages 19 to 21 become narrower, no problems arise because sufficient areas can be secured for these passages 19 to 21 by optimizing the pitches and so on of the corrugated portion 10.

That is, it is possible to say that the thickness of a fuel cell is determined by the outer seal members disposed back to back on both sides of the separators 3 and 4 and the thickness of the seal member 33 for sealing two fuel cells. Accordingly, it is possible to reduce the thickness of the outer seal members while maintaining the thickness of the seal member 33 for sealing to adjacent fuel cells is at a minimum thickness.

Moreover, since the fuel cell stack 8 according to the present embodiment is constituted by stacking a plurality of fuel cells having a reduced thickness as described above in the direction of thickness, the total thickness of the fuel cell stack becomes thin by an amount corresponding to the reduced thickness of a fuel cell times the number of fuel cells being stacked. Since the number of fuel cells of the fuel cell stack is normally around 100, the effect of reducing the thickness of a fuel cell is enormous. As a result, it is possible to reduce a setting space to a large extent when a fuel cell stack 18 is loaded on a vehicle.

Note that the present invention is not limited to use an anode electrode 7 as shown in the above embodiment as the backing member for the electrolyte membrane, which contacts the inner seal member 6.

In place of the anode electrode, for example, it is possible to insert a cathode electrode in between the first separator 3 and the inner seal member 6.

Figure 14:
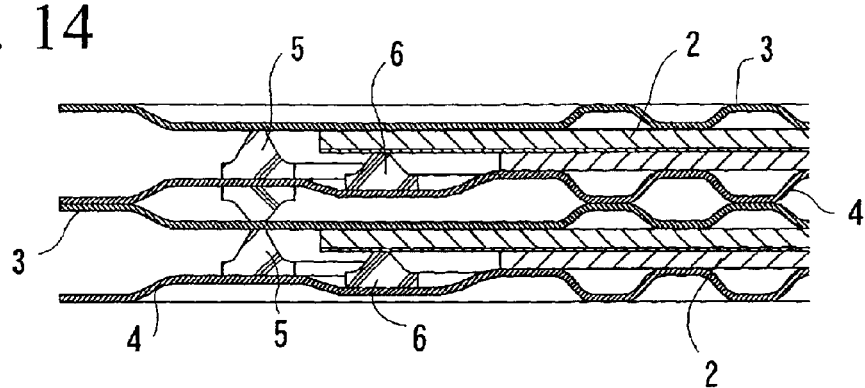
FIG. 14 is a longitudinal cross-sectional view showing a first modified example of the fuel cell shown in FIG. 3.

In the above embodiment, the outer seal member 5 and the inner seal member 6 are integrated by connecting using a connecting portion 25 in order to reduce the number of parts of the fuel cell assembly. However, the present invention is not limited to this constitution, and as shown in FIG. 14, for example, it is a matter of course to produce and arrange the outer seal member 5 and the inner seal member 6 as separate parts for sandwiching the electrolyte membrane 8.

Figure 15:
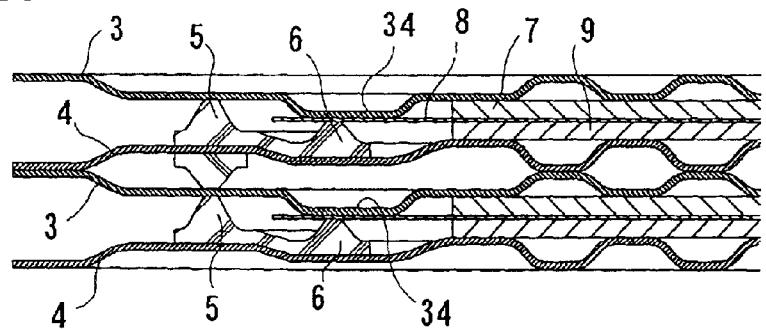
FIG. 15 is a longitudinal cross-sectional view showing a second modified example of the fuel cell shown in FIG. 3.

Furthermore, as shown in FIG. 15, it is possible to adopt a structure to directly sandwich the electrolyte membrane between the inner seal member 6 and a backing plane portion 34, which is formed by protruding downwardly a part of the first separator 3 opposing to the inner seal member 6 interposing the electrolyte membrane 8 by a thickness of the anode electrode.

Figure 16:
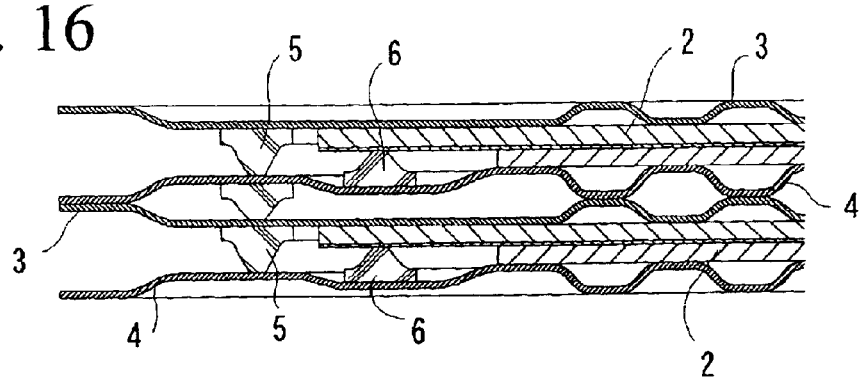
FIG. 16 is a longitudinal cross-sectional view showing a third modified example of the fuel cell shown in FIG. 13.
Figure 17:
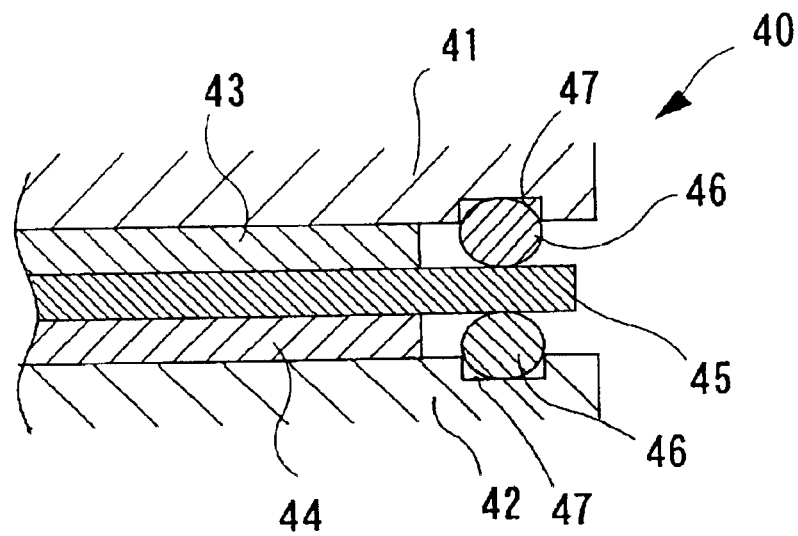
FIG. 17 is a longitudinal cross-section explaining a sealing structure of a conventional fuel cell.
Figure 18:
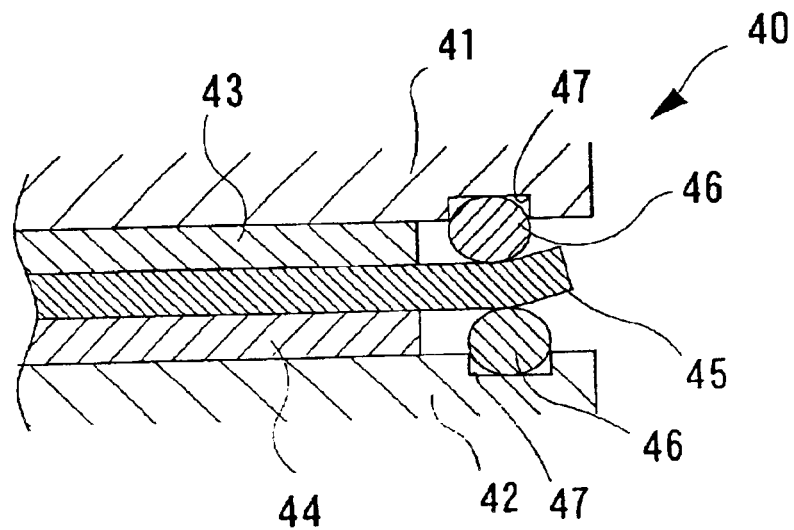
FIG. 18 is a longitudinal cross-sectional view explaining the case when the position of the O-ring is shifted in the sealing structure of a conventional fuel cell.

In addition, although, in the above embodiment, a structure is adopted in which both of the outer seal member 5 and the inner seal member 6 are supported by the plane portion 17 of the second separator 4, it is possible, instead, as shown in FIG. 16, to provide the outer seal member on the first separator 3 and to provide the inner seal member on the second separator 4.

In the above embodiment, a description was provided that it is preferable to set the difference of the level between the first plane portion 22 and the second plane portion 23 at an amount corresponding to a sum of thickness of the anode electrode 7 and thickness of the electrolyte membrane. However, in place of the above structure, the difference of the level may be suitably selected based on various reasons such as for ensuring spaces of passages 19 to 22 for oxidant gas, fuel gas, and cooling medium.

In addition, the seal members 5 and 6 may be adhered to separators at the time of assembly, or may be assembled integrally with the separators.

In addition, although the separators in the above embodiment are formed by metal plates, instead, compact carbon materials may be used.

As described above, the present invention exhibits the following effects.

(1) The first aspect of the present invention provides a fuel cell, in which both side surfaces of the electrolyte membrane is not sandwiched by seal members, but one surface of the electrolyte membrane is provided with a backing member, so that the electrolyte membrane does not deform so that it is possible to define tightly sealed passages on both side surface of the membrane electrode assembly.

In addition, it is possible to reduce a step as the difference in the level between the space to be sealed by the inner seal member and the space to be sealed by the outer seal member. As a result, it is possible to optimize the thickness of respective seal members which results in reducing useless material cost, and reducing the interval between separators which results in reduction of the thickness of the fuel cell.

(2) In the fuel cell according to the second aspect of the present invention, the anode electrode or the cathode electrode is used as the backing member, so that the above effects are obtained without increasing the number of constituting parts while reducing the product cost.

(3) In the fuel cell according to the third aspect, the backing member is formed by the other separator, it is possible to reduce an anode electrode or a cathode electrode, which does not contribute to power generation and to further reduce the product cost further. In particular, since the separator is formed by, for example, press forming a metal plate, the shape of the separator may be freely modified and the separator is a preferable element for use as the backing member of the electrolyte membrane.

(4) Since a fuel cell stack according to the fourth aspect of the present invention is formed by stacking a plurality of the fuel cells whose thickness is reduced as described above, the total thickness can be reduced by an amount corresponding to the reduced thickness for a fuel cell times the number of fuel cell units of the fuel cell stack. Accordingly, it is possible to reduce the setting space of the fuel cell stack when it is loaded in a vehicle.

What is claimed is:

1. A fuel cell comprising:
   a pair of separators sandwiching a membrane electrode assembly having a pair of electrodes provided on each of a first side and a second side of a solid polymer electrolyte membrane;
   an outer seal member sandwiched by the pair of separators at a position surrounding an outer periphery of the membrane electrode assembly;
   an inner seal member sandwiched by one of the pair of separators and said electrolyte membrane; and
   wherein on at least one of said pair of separators a step is formed between a first plane portion in contact with said inner seal member and a second plane portion in contact with said outer seal member.

2. A fuel cell according to claim 1, further comprising:
   a backing member for reinforcing said electrolyte membrane said backing member placed opposing to said inner member so as said electrolyte membrane interposes therebetween.

3. A fuel cell according to claim 2, wherein said backing member is at least one of an anode electrode or a cathode electrode in said pair of electrodes.

4. A fuel cell according to claim 2, wherein said backing member is one of said pair of separators.

5. A fuel cell according to claim 1, wherein a height dimension of said step is set to be the same dimension as that of a total thickness of the electrolyte membrane and a larger electrode among the pair of electrodes.

6. A fuel cell stack, which is formed by stacking a plurality of fuel cells according to claim 1.

7. A fuel cell stack, which is formed by stacking a plurality of fuel cells according to claim 2.

8. A fuel cell stack, which is formed by stacking a plurality of fuel cells according to claim 3.

9. A fuel cell stack, which is formed by stacking a plurality of fuel cells according to claim 4.

10. A fuel cell stack, which is formed by stacking a plurality of fuel cells according to claim 5.

11. A fuel cell comprising:
    a pair of separators sandwiching a membrane electrode assembly having a pair of electrodes provided on each of a first side and a second side of a solid polymer electrolyte membrane;
    an outer seal member surrounding an outer periphery of the membrane electrode assembly to seal a first space formed between the pair of separators when sandwiching the membrane electrode assembly;

an inner seal member sandwiched by one of the pair of separators and an outer periphery of said electrolyte membrane to seal a second space formed therebetween; and wherein on at least one of said pair of separators a step is formed between a first plane portion in contact with said inner seal member and a second plane portion in contact with said outer seal member.

12. A fuel cell according to claim 11, further comprising:

a backing member for reinforcing said electrolyte membrane, said backing member placed opposing to said inner seal member so as said electrolyte membrane interposes therebetween.

13. A fuel cell according to claim 12, wherein said backing member is at least one of an anode electrode or a cathode electrode in said pair of electrodes.

14. A fuel cell according to claim 12, wherein said backing member is one of said pair of separators.

15. A fuel cell according to claim 11, wherein a height dimension of said step is set to be the same dimension as that of a total thickness of the electrolyte membrane and a larger electrode among the pair of electrodes.

16. A fuel cell comprising:

a pair of separators sandwiching a membrane electrode assembly having a first electrode provided on a first side of a solid polymer electrolyte membrane and a second electrode provided on a second side of the solid polymer electrolyte membrane;

an outer seal member sandwiched by the pair of separators at a position surrounding an outer periphery of the membrane electrode assembly;

an inner seal member sandwiched by one of the pair of separators and said electrolyte membrane;

a backing member comprising one of the anode electrode and the cathode electrode for reinforcing the electrolyte membrane, said backing member placed opposing said inner seal member so as said electrolyte membrane interposes therebetween; and wherein on at least one of said pair of separators a step is formed between contact surfaces of said inner seal member and said outer seal member.

17. A fuel cell comprising:

a pair of separators sandwiching a membrane electrode assembly having a first electrode provided on a first side of a solid polymer electrolyte membrane and a second electrode provided on a second side of the solid polymer electrolyte membrane;

an outer seal member sandwiched by the pair of separators at a position surrounding an outer periphery of the membrane electrode assembly;

an inner seal member sandwiched by one of the pair of separators and said electrolyte membrane; and a step formed on one of said separators between a first contact surface of said inner seal member and a second contact surface of said outer seal member, wherein a height dimension of said step is set to be the same dimension as that of a total thickness of the electrolyte membrane and a larger electrode among the pair of electrodes.

* * * * *